Figure 1:
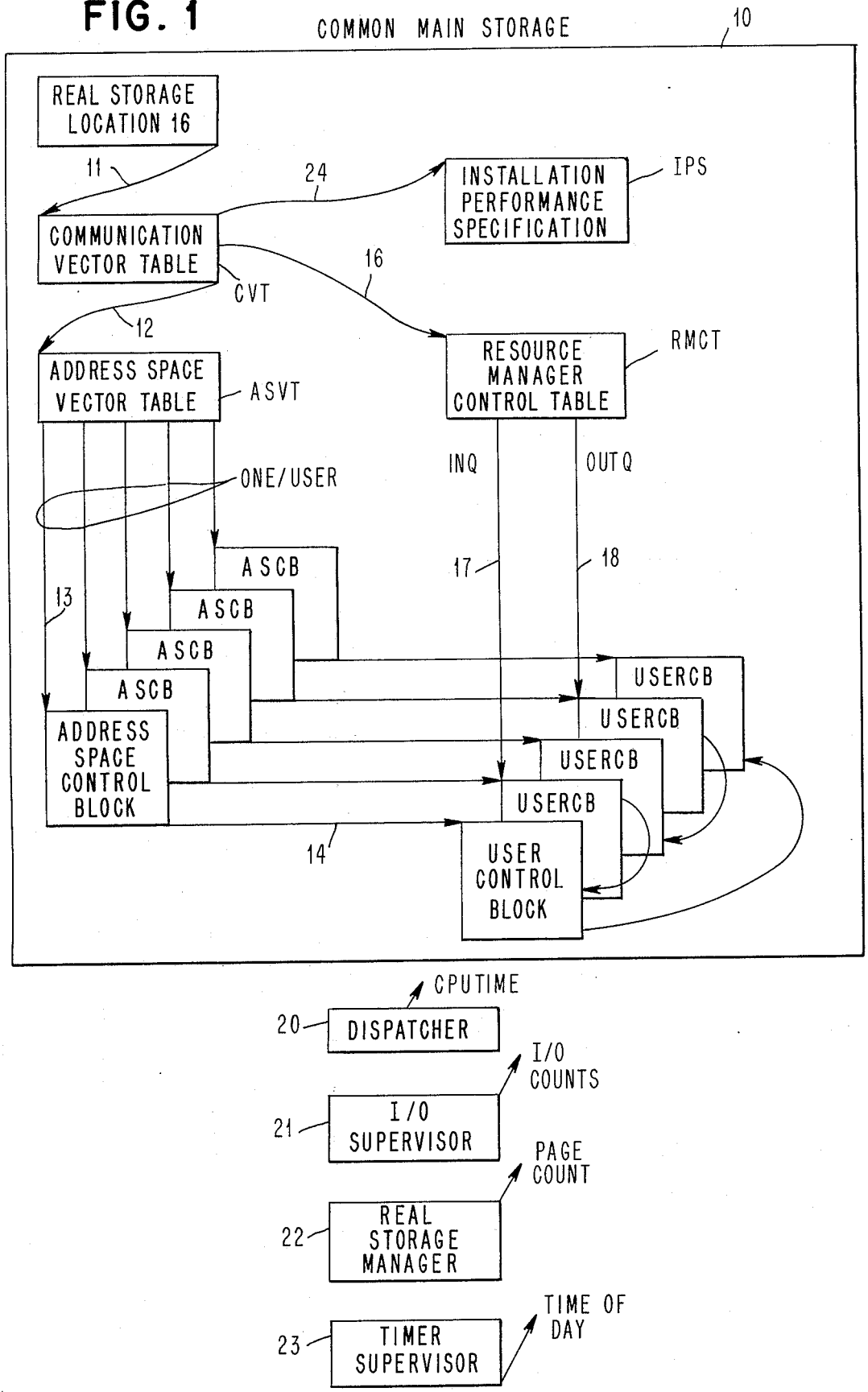
Figure 2:
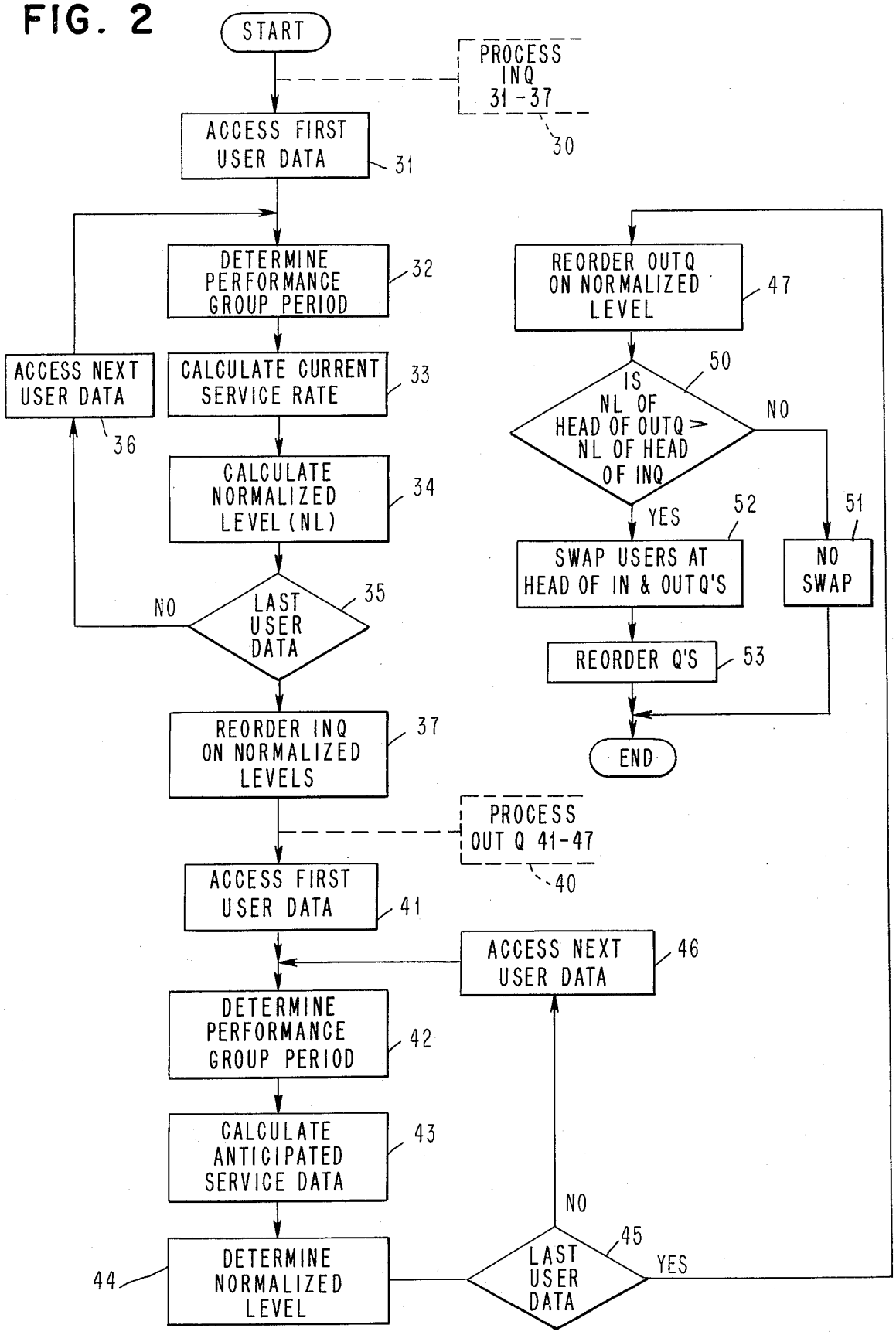
Figure 3:
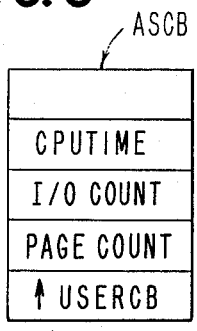
Figure 4:
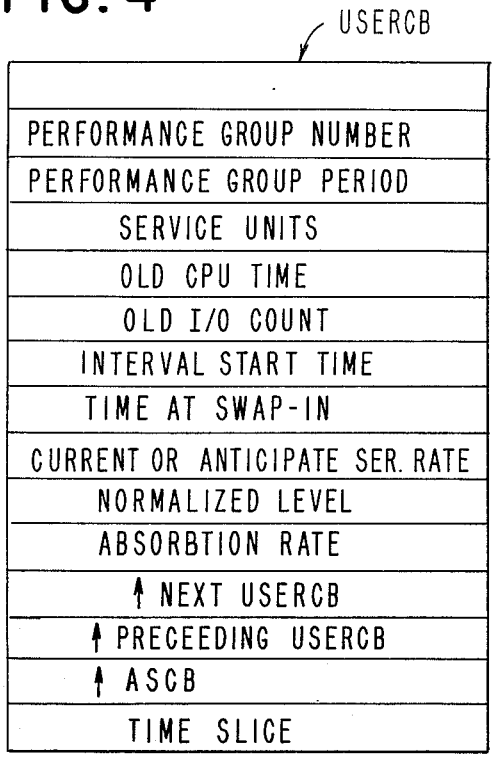
Figure 5:
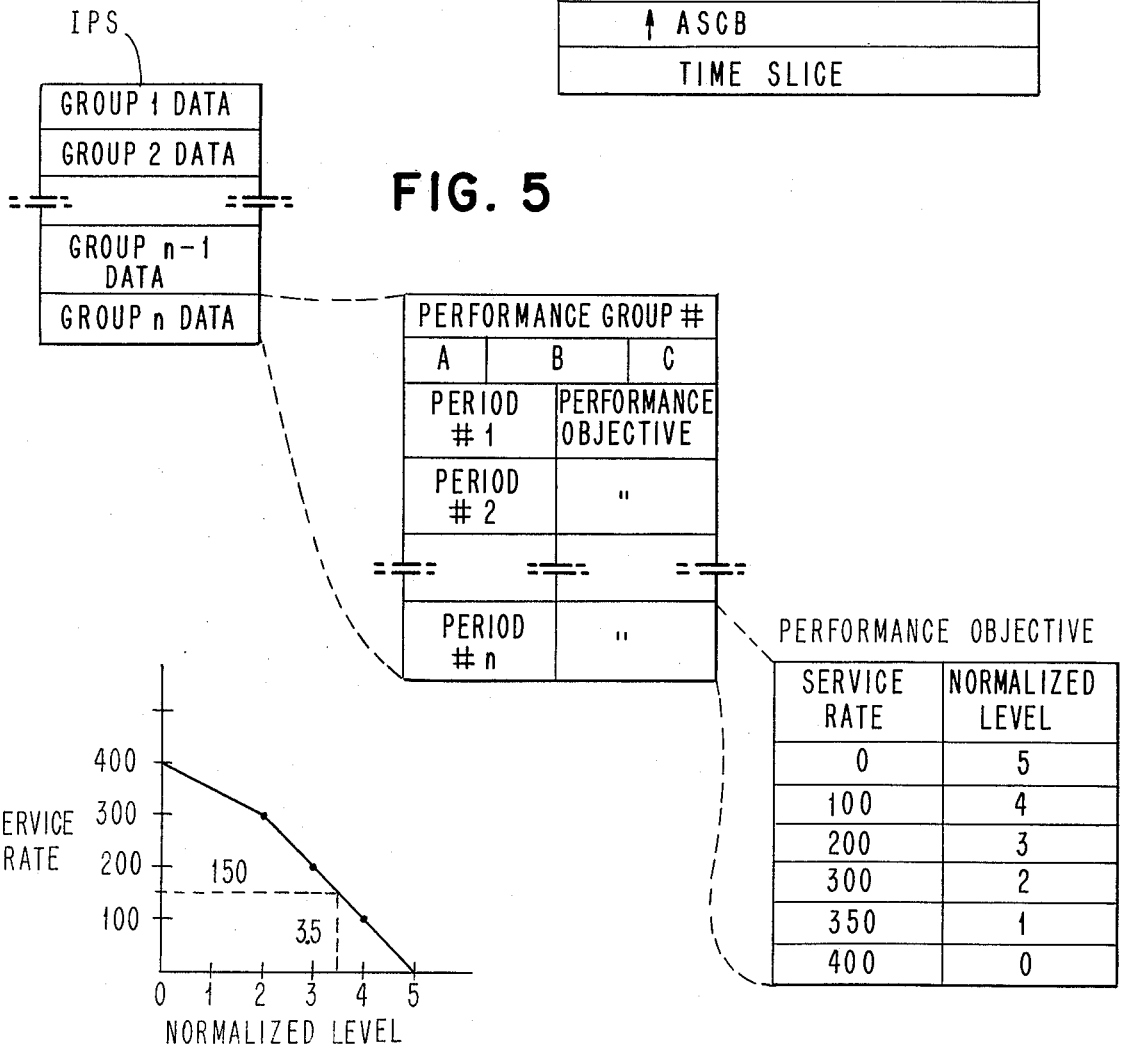
Figure 6:
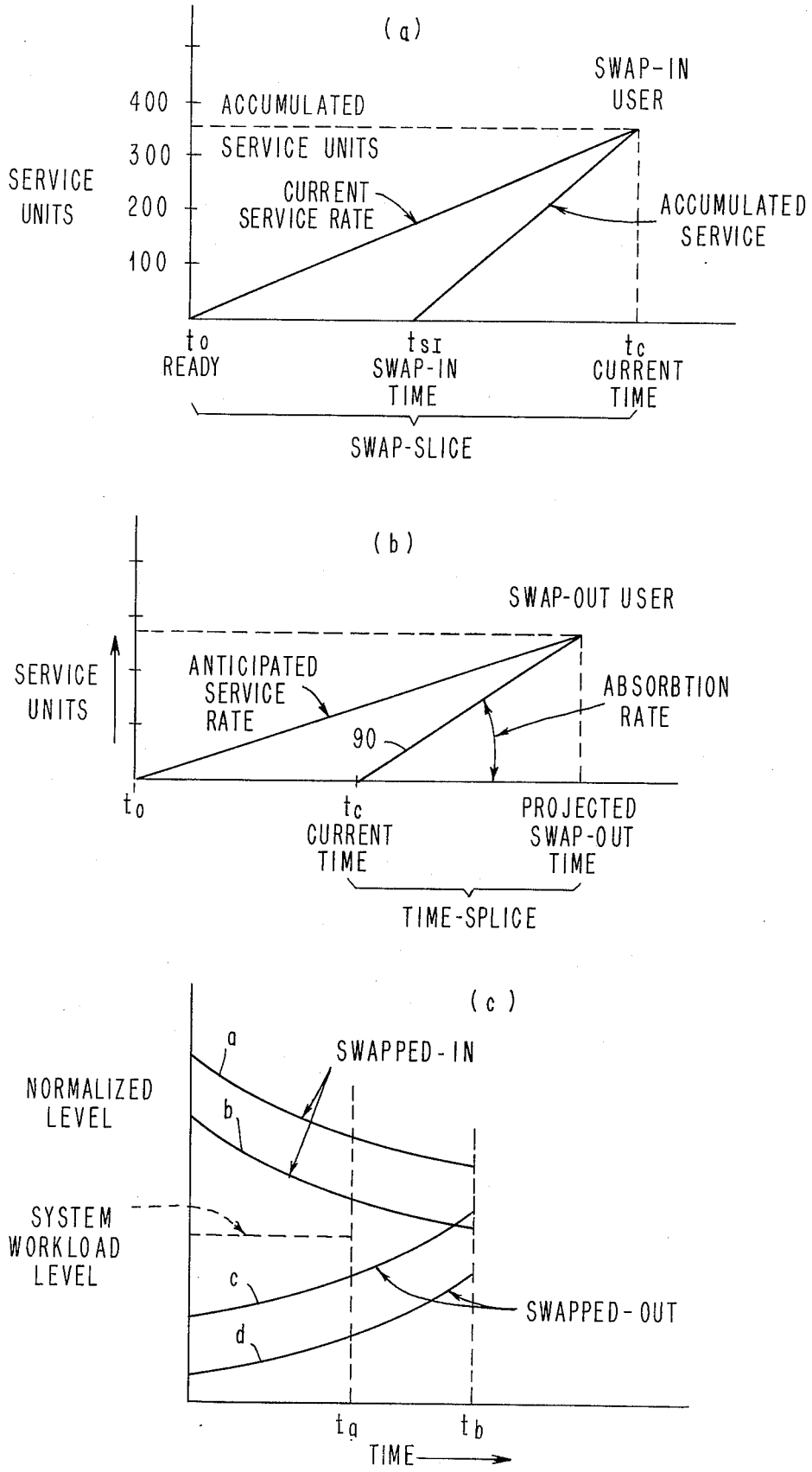

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 7

T946,001

PERFORMANCE DRIVEN WORKLOAD MANAGER

Josiah B. Page, Poughkeepsie, N.Y., assignor to International Business Machines Corporation, Armonk, N.Y.

Continuation of abandoned application Ser. No. 417,847, Nov. 21, 1973. This application Mar. 3, 1975, Ser. No. 554,865

Int. Cl. G06f *9/19*

U.S. Cl. 444—1

4 Sheets Drawing. 23 Pages Specification

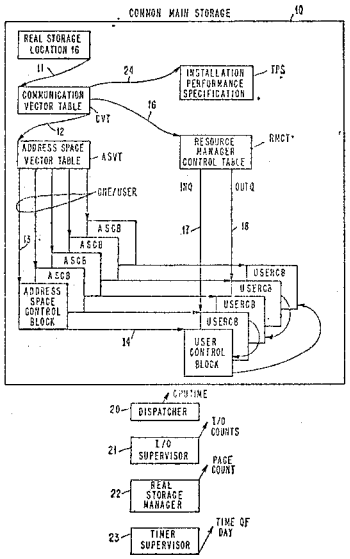

A process for managing the workload in the environment of a terminal oriented date processing system of the type having a virtual memory system and the capabilities of swapping jobs in-and-out of real storage and of over-initiating jobs to saturate the system. An installation performance specification defines in the system different performance objectives which different groups of users or jobs are to be managed to. Key parameters associated with the use of system resources are monitored. On a periodic basis, the workload managing process is performed which determines the current service rates of swapped-in users from the monitored data, the anticipated service rates of swapped-out users, and the normalized levels of all users. Two users, one swapped-in and the other swapped-out, are swapped or exchanged if the normalized level of the swapped-out user is greater than that of a swapped-in user.